United States Patent
Nesson et al.

[11] 3,730,065
[45] May 1, 1973

[54] DEVICE FOR USE WITH SELF-DEVELOPING FILM

[75] Inventors: Israel Nesson, Fairlawn; Robert G. Palmer, Wayne; Edwin E. Faris, Wyckoff; Charles J. Hertling, Bloomfield, all of N.J.

[73] Assignee: Berkey Photo, Inc., Paramus, N.J.

[22] Filed: Feb. 28, 1972

[21] Appl. No.: 229,942

[52] U.S. Cl. ................................................. 95/13
[51] Int. Cl. ........................................... G03b 17/52
[58] Field of Search .......................... 95/13, 89 R

[56] References Cited

UNITED STATES PATENTS

| | | | |
|---|---|---|---|
| 3,641,908 | 2/1972 | Eloranta | 95/89 R |
| 3,165,039 | 1/1965 | Downey | 95/13 |
| 3,270,643 | 9/1966 | Fernald | 95/13 |
| 3,499,373 | 3/1970 | Cotta | 95/13 |

Primary Examiner—Samuel S. Matthews
Assistant Examiner—Alan Mathews
Attorney—Albert H. Pendleton et al.

[57] ABSTRACT

A device is provided for use in a camera utilizing self-developing film. The film in question comprises a rupturable pod of processing liquid which is sandwiched between a pair of photographic sheets. Attached to the exterior of one of the sheets and disposed adjacent the leading end thereof is an elongated removable feeder tab. The device is disposed within the camera and includes a pair of elongated spreader members which are biased towards one another to assume a substantially superposed relation and define an elongated predetermined minimum gap through which the photographic sheets and the pod, when in a collapsed state, are caused to move. As the film moves through the gap, the pod is ruptured and the processing liquid uniformly spread between the sheets. Compression means are disposed adjacent the infeed side of the gap and provide uninterrupted pressure on the opposite marginal segments of the film sheets. Compressive pressure is continuously exerted on the opposite marginal segments of the film from a location substantially upstream of the spreader members into the gap between the spreader members and thereby confining the spread of the processing liquid to between the compressed marginal segments. Portions of the compression means extend into the gap and engage the film while the latter is moving therethrough. The device includes a guide means which is disposed adjacent the infeed side of the gap and directs the leading end of the film into the gap. The feeder tab carried by one of the photographic sheets is positioned over the guide member so as to circumvent the gap. The feeder tab projects outwardly from the camera housing and, as it is manually pulled therefrom, the feeder tab will cause the leading ends of the photographic sheets to pass through the gap and extend outwardly from the camera housing whereupon they may be grasped for manual pulling of the remainder of the film through the gap.

15 Claims, 9 Drawing Figures

Patented May 1, 1973
3,730,065
2 Sheets-Sheet 1
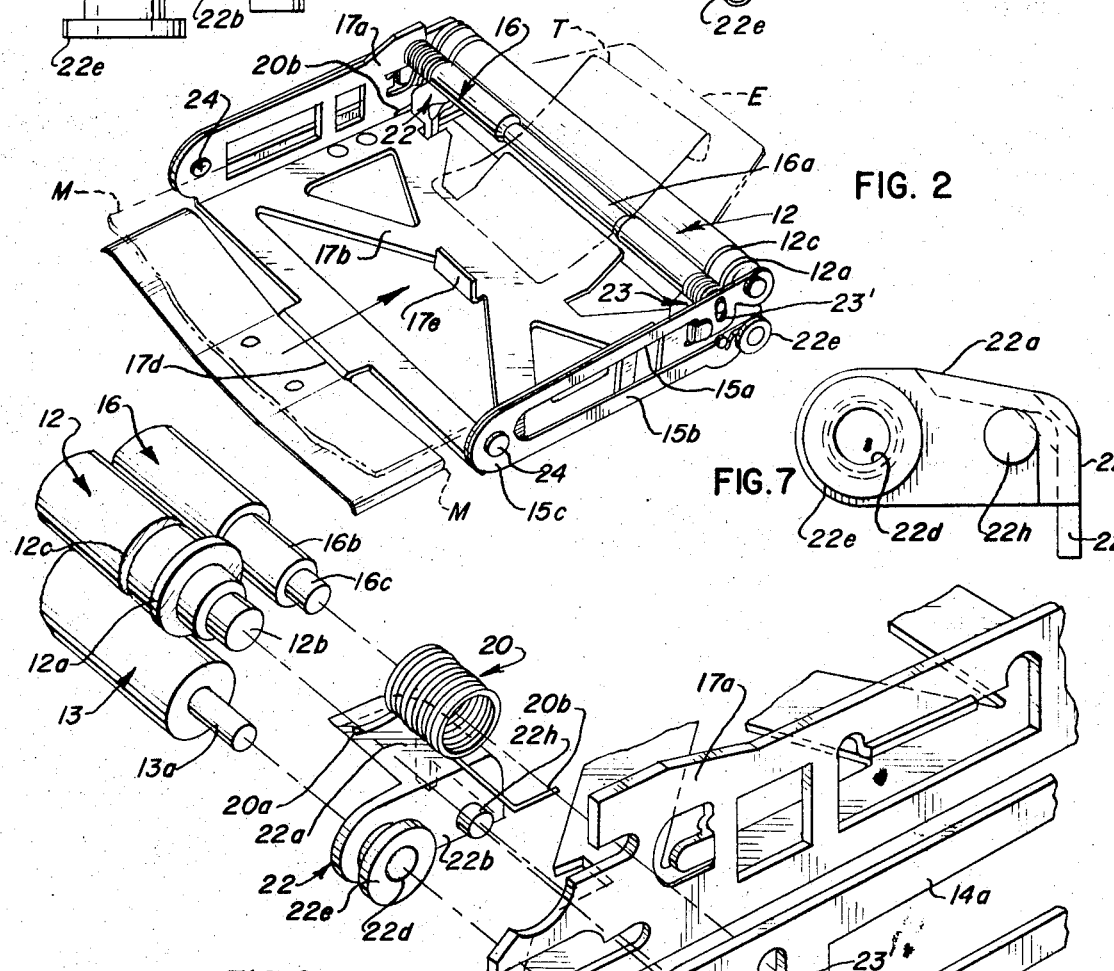

Patented May 1, 1973 3,730,065
2 Sheets-Sheet 2
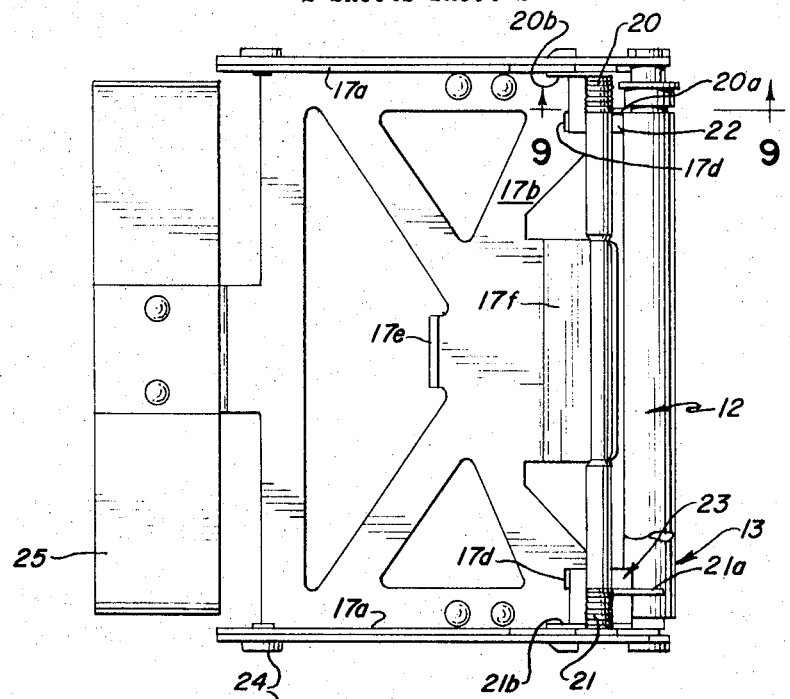
FIG. 3
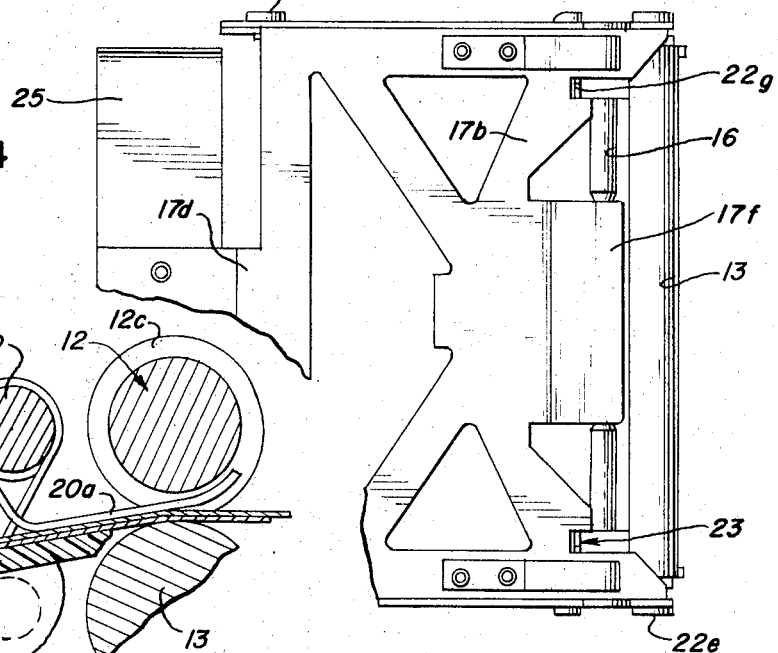
FIG. 4
FIG. 9
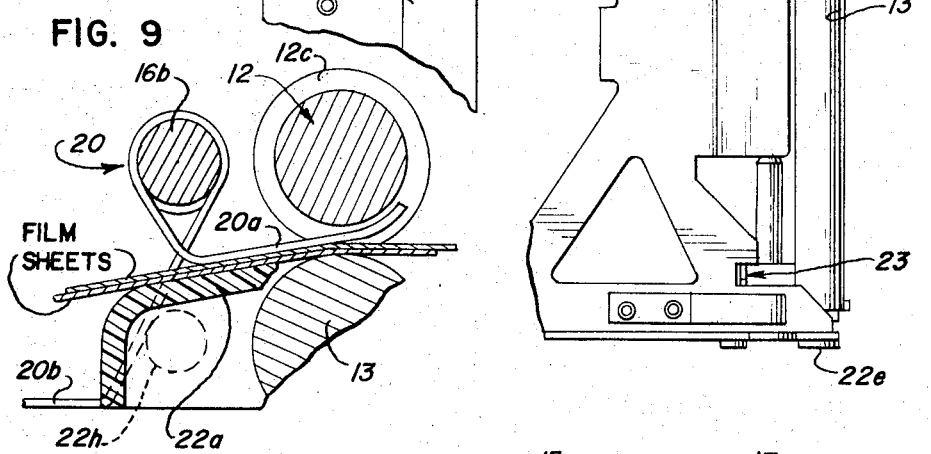
FIG. 5
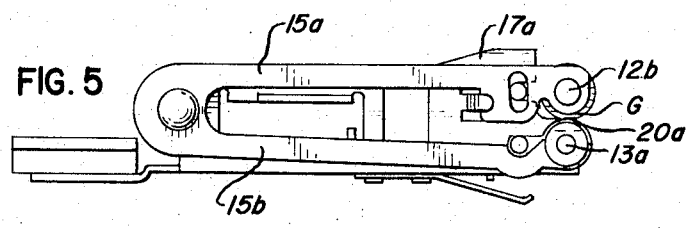

DEVICE FOR USE WITH SELF-DEVELOPING FILM

BACKGROUND OF THE INVENTION

Various devices have heretofore been provided for spreading the processing liquid between the photographic sheets of self-developing film upon the latter being moved a predetermined distance through a camera. Because of certain design characteristics, however, the devices have been beset with one or more of the following shortcomings: (a) they were of a complex and costly construction; (b) the spreader members were ineffective in uniformly spreading the processing liquid between the photographic sheets once the pod containing the liquid was ruptured; (c) leakage of the processing liquid occurred along the margins of the film as the latter was moved through the device; (d) the film frequently became jammed in the device; and (e) moving of the film through the device was an awkward manual manipulation and often resulted in a failure to evenly develop the film.

SUMMARY OF THE INVENTION

Thus, it is an object of this invention to provide a device of the type described which avoids the shortcomings aforenoted.

It is a further object of the invention to provide a device of the type described which is of simple, compact and sturdy construction and may be readily disposed within a camera utilizing self-developing film without causing the size of the camera to be inordinately enlarged, or interfering with the normal operation of such a camera.

It is a further object of the invention to provide a device of the type described which requires little or no maintenance and is readily capable of handling either black and white or color self-developing film presently available on the market.

Further and additional objects will appear from the description, accompanying drawings, and appended claims.

In accordance with one embodiment of the invention, a device of the type described, is provided which includes a frame, a pair of elongated spreader members arranged in a substantially superposed relation and defining an elongated predetermined minimum gap, and spring means carried by the frame and on which the ends of the spreader members are mounted. The spring means bias the spreader members toward one another to form the minimum gap. An elongated guide means is carried by the frame and is disposed adjacent the infeed side of the gap. The guide means is adapted to direct the leading end of the film into the gap and at the same time cause a feeder tab, which is normally a part of the film, to be diverted so that it will circumvent the gap. A compression means is provided which has first portions mounted on the frame adjacent the infeed side of the gap, and resilient second portions carried adjacent the ends of the guide means and cooperating with the first portions to compress the opposite marginal segments of the photographic sheets of the film, as the latter move through the gap between the spreader members. As the film sheets are moved through the gap, the pod of processing liquid, which is sandwiched between the sheets, is ruptured. The compressed marginal segments of the film sheets cause the spreading of the processing liquid to be confined therebetween. A part of each resilient second portion of the compression means is disposed within the gap and is adapted to resiliently engage the marginal segments of the film sheets as they move between the spreader members.

DESCRIPTION

For a more complete understanding of the invention reference should be made to the drawings wherein:

FIG. 1 is a perspective view of one form of the improved device taken from the discharge side of the spreader members.

FIG. 2 is similar to FIG. 1, but taken from the infeed side of the spreader members and showing in phantom, a portion of the self-developing film moving through the device in the direction of the arrow.

FIG. 3 is a top view of the device of FIG. 1.

FIG. 4 is a bottom view of the device of FIG. 1.

FIG. 5 is a side elevational view of the device of FIG. 1 and with the discharge end thereof disposed to the right.

FIG. 6 is an enlarged, fragmentary perspective view of the corner of the device of FIG. 1 and showing the components thereof in exploded relation.

FIG. 7 is an enlarged side elevational view of a component of the compression means.

FIG. 8 is a top view of the component of FIG. 7.

FIG. 9 is an enlarged fragmentary sectional view taken along line 9—9 of FIG. 3 and showing the compression means acting upon the marginal portion of the film.

Referring now to the drawings and more particularly to FIGS. 1 and 2, one form of the improved device 10 is shown which is adapted to be used in a camera, not shown, utilizing self-developing film 11, the latter being shown in phantom in FIG. 2. A camera of the type in question may be that presently marketed by Polaroid Corp. of Cambridge, Mass., under the name "Colorpack II Land Camera". It is to be understood, of course, that device 10 is not limited for use in this precise camera, but may be utilized in other types of cameras utilizing the self-developing film, whether the latter be black and white or color. The film 11, adapted for use with the device in question, consists of sets of superposed sheets of film arranged in stacked relation within a suitable rectangular cartridge, not shown. The cartridge is sized so that it may be readily slipped into a rear compartment of the camera when the latter is to be loaded or reloaded. The film cartridge may be of a type presently marketed by the Polaroid Corp. under the name "Polaroid 3000 Speed, Type 107". Each set of film sheets used with the device 10 includes a rupturable pod of processing liquid which is sandwiched between a pair of photographic sheets. Removably attached to the exposed surface of the uppermost film sheet, is an elongated feeder tab T, which, when manually pulled, causes the leading edge E of the superposed film sheets to be properly positioned initially in the device so that said leading edge will be exposed outside the camera housing and adapted to be subsequently pulled manually in a manner to be hereinafter described.

Device 10, as illustrated, includes a pair of elongated spreader members 12 and 13 which take the form of rollers, disposed in superposed proximate relation. The term "superposed", as used herein, is intended to cover the rollers being disposed in side-by-side or coextensive relation. The rollers are biased towards one another by a pair of substantially U-shaped springs 14 and 15. Each spring is of like construction and is formed of a suitable resilient material for exerting the necessary biasing force.

Roller 12 is provided at opposite ends thereof with annular shoulders 12a which are adapted to tangentially engage the periphery of roller 13 and form an elongated gap G of predetermined minimum dimensions. The outer surfaces of the rollers are smooth, so as not to mar or deface the film sheets as they move through the gap. Opposite ends of the rollers are provided with axially extending spindles 12b and 13a, see FIG. 6, which are adapted to be journaled in the corresponding ends of legs 14a and b and 15a and b of the springs 14 and 15.

Roller 12 is also provided with a pair of annular grooves or recesses 12c which are disposed inwardly of, but adjacent to, the shoulders 12a. The function of the grooves will be discussed more fully hereinafter.

Positioned in close proximity to the infeed side of the gap G, is an elongated guide means which is shown as a roller 16. The roller 16 is supported at its opposite ends by upright side flanges 17a of a frame 17, which will subsequently be described in greater detail. The guide roller 16 is substantially coextensive with the rollers 12 and 13 and is arranged in substantially parallel relation therewith. The central portion 16a of roller 16 is recessed slightly. The opposite ends of roller 16 are each provided with a recessed bearing surface 16b and an axially-extending spindle 16c, see FIG. 6. The spindles 16c are journaled in suitable openings formed in the frame side flanges 17a. The distal ends of the spindles 16c terminate within elongated slots 18 formed in the corresponding upper legs 14a and 15a of the springs 14 and 15.

The bearing surfaces 16b of guide roller 16 are embraced by coil springs 20 and 21. The springs 20 and 21 are of like construction and each has an end portion 20a or 21a which extends downwardly and forwardly from the bearing surface 16b, see FIGS. 3 and 9. The end portion normally extends through the gap formed between the spreader rollers 12 and 13 and terminates on the discharge side of the gap. The end portion 20a or 21a is aligned with the annular groove 12c formed in roller 12. The spring end portion 20a or 21a engages the marginal segments M of the film when the latter is moving through the gap, and is offset upwardly a slight amount into the aligned annular groove 12c.

The opposite end portion 20b or 21b of spring 20 or 21, extends rearwardly and downwardly from the bearing surface 16b and rests upon a base section 17b forming a part of the frame 17, see FIG. 9. Each forwardly extending end portion 20a or 21a of the spring 20 or 21, coacts with a component 22 or 23, which is fixedly disposed beneath the spring end portion 20a or 21a and adjacent the infeed side of the gap G. Each component 22 or 23 is of like construction and is preferably of one-piece construction. As seen in FIGS. 6–8, only component 22 is shown and includes a broad, smoothly curved top surface 22a over which the underside of a segment M of the margin or edge of the superposed film sheets is caused to pass prior to said marginal segment entering the gap G.

As seen in FIG. 9, the surface 22a extends from a position substantially beneath the guide roller 16 to a position substantially at the gap G. Thus, compressive force is exerted on the marginal segment M of the film for a substantial distance prior to the segment entering the gap G. Thus, by reason of this arrangement the possibility of the developing fluid leaking out from between the photographic sheets is eliminated. In various prior constructions, such leakage was a problem due to the fact that the compressive force exerted on the marginal segments was a point contact which occurred a substantial distance ahead of the spreader members and thus, there was a substantial distance wherein said marginal segment was unsupported and not subjected to compressive forces. In the instant construction, there is substantially uninterrupted compressive force exerted upon the marginal segment over a considerable distance of travel of the segment prior to entering the gap G.

A depending flange 22b is formed adjacent the outer edge of surface 22a. Flange 22b has a portion thereof which extends forwardly of the surface 22a and has formed thereon, a laterally, outwardly extending bearing 22c. A center bore 22d is formed in the bearing and extends through the flange so as to accommodate the spindle 13a of the spreader roller 13, see FIG. 6. The outer end of the bearing is provided with an annular collar 22e which is adapted to engage the outer surface of the arm 14b or 15b of the spring 14 or 15, see FIGS. 1 and 2. As seen in FIG. 6, the end of arm 14b is notched at N to accommodate the bearing 22c. The collar 22e is spaced outwardly from flange 22b so as to accommodate not only the notched end of arm 14b, but also a bifurcated portion 17c of the frame side flange 17a, see FIG. 6.

The rear, or upstream, portion of the support surface 22a bends downwardly, as seen in FIG. 7, to form a rear wall 22f. A depending lug 22g is formed along the bottom edge of wall 22f and is adapted to be disposed within a suitable opening 17d formed in the base section 17b of the frame 17. The lug 22a serves to retain the component 22 in a fixed position relative to the carriage.

A studlike projection 22h is also formed on flange 22b and extends outwardly therefrom and is adapted to project through the bifurcated end 17c of the frame side flange 17a and terminate within an elongated, vertically disposed slot 23' formed adjacent the end of spring arm 14a or 15a, see FIGS. 1 and 2. The elongated configuration of the slot 23' permits relative movement of the spring arms and the spreader rollers 12 and 13 so as to enlarge the height of the gap G, when the film sheets move through the gap, without interference from the ends of the guide roller 16.

The upstream, or rearwardly extending ends of the spring arms 14a and b, or 15a and b, are interconnected by a loop portion 14c or 15c. Each loop portion is riveted at 24, or otherwise secured to the frame side flange 17a. As a result of the springs 14 and 15 being secured to the frame flanges, the device 10 is of a unitary construction, thereby making it convenient to handle when being assembled in a camera.

The frame base section 17b is of skeletal construction so as to reduce weight, and is provided with a rearwardly extending tongue 17d to which is connected a leaf spring 25. The spring 25 is adapted to resiliently engage the film cartridge when the latter is loaded into an interior compartment of a camera, and thus, retain the cartridge in proper position within said compartment.

The frame base section 17b is provided with a centrally disposed upright projection 17e which is adapted to engage the underside of the superposed film sheets 11, when the latter are being moved through the device. The projection 17e prevents any sagging of the film sheets as the sheets move towards the gap between the spreader rollers.

A forwardly disposed projection 17f is also formed on the frame base section 17b and serves to align the leading ends E (sometimes referred to as leader tabs) of the film sheets with the infeed side of the gap. The upper surface of the film sheets 11 will engage the underside of the guide roller 16 while the undersurface of the film sheets is engaging the projection 17f.

As aforementioned, the central portion 16a of the guide roller 16 is recessed, and said portion facilitates placement of the elongated feeder tab T, removably attached to the top surface of the film sheets, over the top of the guide roller 16 and the upper spreader roller 12. The feeder tab will extend through a suitable opening formed in the side of the camera and be accessible for manual pulling. Upon the feeder tab being pulled out of the camera side, said feeder tab, in turn, will cause the film sheets to move and the leading ends E thereof to move through the gap and out of the camera housing through a suitable opening formed in the latter. After one of the photographic sheets has been exposed, the superposed film sheets are pulled completely out of the camera housing.

The size of the gap G formed between the spreader rollers, is such that it is less than the thickness of the pod of processing liquid, which is sandwiched between the photographic sheets and thus, said pod will be ruptured when the film is manually pulled through the gap prior to being removed from the camera. Once the pod is ruptured, the spreader rollers 12 and 13 will coact with the superposed sheets and cause the processing liquid to be uniformly spread between the sheets. The compressed marginal segments of the sheets will confine, therebetween, spreading of the liquid.

Thus, it will be seen that an improved device, of the type described, has been provided which is compact, simple, and yet of sturdy construction. The device may be readily used with self-developing film which is currently available on the market. The device will not mar or deface the film as it is moved through the device and will effectively prevent the processing liquid from leaking out along the margins of the film.

We claim:

1. In a camera utilizing self-developing film wherein the latter is provided with a rupturable pod of processing liquid sandwiched between a pair of photographic sheets, at least one of the sheets carrying a feeder tab; a device positionable within the camera for distributing the processing liquid between the sheets as the latter are moved a predetermined distance through said device, said device comprising a frame, upper and lower elongated spreader members supported on said frame and biased towards one another to assume a substantially parallel superposed relation, means cooperating with said spreader members for maintaining an elongated predetermined minimum gap between said spreader members, said gap accommodating the film sheets, and when the latter are moved therethrough, causing rupture of the pod and uniform spreading of the processing liquid between the sheets, guide means supported on said frame and in parallel relationship to said spreader members disposed adjacent the infeed side of the gap for directing the leading ends of the sheets into the gap and causing the feeder tab to circumvent said gap, and compression means disposed adjacent the infeed side of said gap and engaging opposite marginal segments of the film sheets as the latter move through said gap; said compression means having first portions supported adjacent the ends of said guide means and extending from said guide means through said gap and second portions supported on said frame and extending to the infeed side of said gap; said first portions being biased towards said second portion and towards said lower spreader member; said second portions being adapted to subtend the marginal segments of the film sheets whereby substantially uninterrupted compressive force is exerted on the marginal segments of the film sheets as the latter move from the guide means through said gap whereby the processing liquid is confined between the sheet marginal segments.

2. The device of claim 1 wherein each first portion of said compression means comprises an elongated spring extending downwardly from one end of said guide means towards the adjacent fixed second portion and forwardly along the latter into said gap.

3. The device of claim 2 wherein said spreader members comprise a pair of elongated rollers and the periphery of one roller being provided with an annular groove to accommodate the forwardly extending end of said elongated spring disposed within said gap.

4. The device of claim 1 wherein the ends of said spreader members are supported by resilient elongated arms, the arms supporting corresponding ends of said spreader members being interconnected and biasing said spreader members towards one another.

5. The device of claim 4 wherein the frame has a first base section thereof subtending the moving film sheets; the interconnected resilient arms being fixedly secured to laterally spaced second sections of said carriage extending from the base section thereof, and the ends of said guide means being connected to forwardly disposed portions of said second sections of said carriage; the first and second sections of said carriage being of unitary construction.

6. The device of claim 5 wherein the base section of said frame is provided with a protruding means disposed upstream of said guide means and supportingly engaging the underside of one film sheet prior to the latter moving past said guide means.

7. The device of claim 2 including resilient elongated arms mounted on said frame and supportingly engaging opposite ends of said spreader members and biasing same towards one another, a carriage on which said elongated arms are mounted and on which opposite ends of said guide means are mounted, movement of said spreader members being independent of said guide means; each second portion of said compression means having a broad supporting surface extending from a location adjacent said guide means to a location closely adjacent said gap for engaging the marginal segment of the moving film sheets on one side thereof while the opposite side thereof is resiliently engaged by the elongated spring of said compression means, said second portion of said compression means also including a connector portion extending forwardly from said supporting surface and connected to one end of one spreader member, and stop means on said connector portion engaging said carriage and a resilient elongated arm for restraining lateral movement of said supporting surface relative to said compression means elongated spring.

8. The device of claim 7 wherein the supporting surface, connector portion, and stop means of each sound portion of the compression means are of one-piece construction.

9. The device of claim 2 wherein each elongated spring has a portion thereof encompassing said guide means.

10. The device of claim 3 wherein an elongated roller of said pair of rollers is provided with a pair of longitudinally spaced annular shoulders, the extent to which said shoulders project from the periphery of said roller and the relative location of said shoulders on said roller determining the dimensions of the elongated predetermined minimum gap, said shoulders being biased into tangential engagement with the periphery of the other roller of the pair.

11. The device of claim 5 wherein the second sections of said frame are disposed intermediate the resilient arms supporting opposite ends of said spreader members.

12. The device of claim 9 wherein the guide means includes an elongated roller supported at opposite ends for rotation about its longitudinal axis, and each elongated spring has a portion thereof wound about an end of the guide means roller.

13. The device of claim 12 wherein the central portion of said guide means roller is recessed to facilitate locating of the feeder tab thereover and cause the tab to circumvent the gap between said spreader members.

14. The device of claim 6 wherein the protruding means in the base section of said frame includes a first element resiliently engaging the film sheets and maintaining same in a position of registry with respect to the lens and shutter of the camera; a second element disposed intermediate said first element and said guide means and slidably engaging the underside of the film sheets upon the latter being moved from the position of registry to the gap between said spreader members; and a third element disposed intermediate said second element and said spreader members and adjacent the upstream side of said guide means and slidably engaging the film sheets underside and effecting guiding of the leading edge of said film sheets beneath said guide means and into said gap and guiding the feeder tab over said guide means and away from said gap as said film sheets are moved away from the position of registry.

15. The device of claim 7 wherein said frame includes elongated pockets in which the opposite ends of said guide means are movable longitudinally within said pockets.

* * * * *